United States Patent
Chang et al.

(10) Patent No.: US 6,700,956 B2
(45) Date of Patent: *Mar. 2, 2004

(54) APPARATUS FOR SELECTIVELY CONNECTING A TELEPHONE TO A TELEPHONE NETWORK OR THE INTERNET AND METHODS OF USE

(75) Inventors: Tsung-Yen Dean Chang, Los Altos Hills, CA (US); Chuang Li, Saratoga, CA (US); Chee Hin Ho, San Jose, CA (US); Bin Lang Gu, Sunnyvale, CA (US)

(73) Assignee: Actiontec Electronics, Inc., Sunnyvale, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/517,194

(22) Filed: Mar. 2, 2000

(65) Prior Publication Data
US 2002/0164003 A1 Nov. 7, 2002

(51) Int. Cl.⁷ ............................................. H04M 11/00
(52) U.S. Cl. .................. 379/93.09; 379/93.05
(58) Field of Search .................... 379/93.05, 93.09, 379/93.27, 93.35, 345, 399, 384; 370/352, 353, 356; 395/200.57

(56) References Cited

U.S. PATENT DOCUMENTS

| | | | | |
|---|---|---|---|---|
| 4,485,277 A | * | 11/1984 | Minch et al. | ................ 379/345 |
| 5,563,938 A | * | 10/1996 | Soshea et al. | .......... 379/211.01 |
| 5,761,280 A | * | 6/1998 | Noonen et al. | .......... 379/93.27 |
| 6,011,909 A | * | 1/2000 | Newlin et al. | .......... 395/200.57 |
| 6,029,047 A | * | 2/2000 | Ishida et al. | ............. 379/93.09 |
| 6,091,721 A | * | 7/2000 | Greenberg et al. | .......... 370/352 |
| 6,118,857 A | * | 9/2000 | Terschluse | ............... 379/93.35 |
| 6,167,043 A | * | 12/2000 | Frantz | ........................ 370/356 |

OTHER PUBLICATIONS

Promotional material regarding dialpad.com's internet phone service, downloaded from www.dialpad.com, Feb. 4, 2000(2 pages).
Promotional material for mediaring.com, downloaded from www.mediaring.com, Feb. 4, 2000 (4 pages).
Promotional material for Net2phone, Inc., downloaded from www.net2phonepro.com, Feb. 4, 2000 (5 pages).
Promotional material fpr Quicknet Technologies, Inc., downloaded from www.quicknet.com, Feb. 9, 2000 (12 pages).

* cited by examiner

*Primary Examiner*—Xu Mei
*Assistant Examiner*—Jefferey Harold
(74) *Attorney, Agent, or Firm*—Fish & Neave; Norman H. Beamer; Daniel M. Becker

(57) ABSTRACT

Apparatus and methods are provided for selectively providing telephone service that is either PSTN-based or Internet-based using a standard analog telephone circuit. In a first embodiment, the apparatus comprises a hardware module and associated software for coupling a personal computer or Internet appliance and a standard analog telephone. The apparatus includes a DTMF interface circuit, a subscriber line interface circuit, a ring detection circuit, and an interface circuit for interfacing with the PC or Internet appliance. The apparatus permits the analog telephone to be toggled between an Internet-based telephone mode and a PSTN-network mode by inputting a predetermined sequence of DTMF digits. In alternative embodiments, the apparatus comprises a processor, modem and optionally, analog telephone circuit, to provide a stand-alone or partially-integrated device capable of selectively switching between PSTN-based and Internet-based telephony services.

57 Claims, 9 Drawing Sheets

APPARATUS FOR SELECTIVELY CONNECTING A TELEPHONE TO A TELEPHONE NETWORK OR THE INTERNET AND METHODS OF USE

BACKGROUND OF THE INVENTION

Internet telephony services are known that permit an Internet user with a personal computer equipped with a sound card, speaker, microphone and modem to initiate a call from the computer and transmit the call over the Internet to a telephone connected to the public switched telephone network ("PSTN") or to another similarly equipped personal computer. For example, Net2phone, Inc., Dialpad, Inc., and MediaRing, Inc. provide software and services that permit an Internet user to place a call from their computer, and communicate with the called party using the sound card, speaker and microphone of the caller's computer.

Internal computer cards, such as the Internet PhoneJACK™, available from Quicknet Technologies, Inc., San Francisco, Calif., permit a user of the foregoing services to connect a standard analog telephone to the personal computer, for use in placing and receiving Internet telephone calls. A telephone coupled to such an internal computer card, however, cannot be switched to place a telephone call using the PSTN unless it is physically unplugged from the internal computer card and then reconnected to the telephone network.

Net2phone, Inc., also provides a service called "Net2phone Direct" that permits users to use a standard analog telephone to place a call over the Net2phones Internet Telephony network. In this system, the user dials a local number to access Net2phone, Inc.'s gateway, which then prompts the user for an account number and the telephone number of the party to be called. The system digitizes the user's voice and transmits the call over the Internet to another gateway located near the called party. That gateway switches the call to the local PSTN network to complete the call. Although the user does not need an Internet account to place a call using this system, the user must have an account with Net2phone, Inc., and is limited to using the telephone with that service. Further, the user may not switch between an Internet call and a PSTN call without terminating the Internet call.

Net2phone, Inc., also has announced an agreement to develop a specialized telephone that can be used to select between PSTN-based long distance telephone service and Internet-based long distance service by pressing a button on the telephone. The user must register the telephone and must select a flat fee arrangement for the Internet-based long distance service. The proposed telephone must be purchased, and may not be usable with other Internet-based telephony services. In addition, it is unclear whether a user can switch between a PSTN-based call and an Internet call without terminating the other call. For example, if a user were engaged in an Internet-based telephone call and received an incoming call from the PSTN network, it is unclear whether the user could receive a call-waiting notification, and if so, whether the user could accept the incoming call without first terminating the Internet-based call.

It would therefore be desirable to provide apparatus and methods that permit a user to seamlessly and dynamically switch between Internet-based telephony service and PSTN-based telephony service.

It further would be desirable to provide apparatus and methods that enable a standard analog telephone circuit to be selectively connected to either the PSTN network or an Internet-based telephony service.

It also would be desirable to provide apparatus and methods that detect the presence of PSTN network service and provide either the PSTN network dial tone or a synthesized dial tone when handset is taken off-hook.

It still further would be desirable to provide apparatus and methods, useable in conjunction with call-waiting capable modems, that enable a user to receive a call-waiting signal and switch between Internet-based telephony service and PSTN-based telephony service.

It also would be desirable to provide apparatus and methods that enable a user to receive a ring signal and switch between Internet-based telephony service and PSTN-based telephony service.

It yet further would be desirable to provide apparatus and methods that enable a user to seamlessly switch between Internet-based and PSTN-based telephony service using a device that incorporates a microprocessor and modem, and optionally, an analog telephone circuit.

SUMMMARY OF THE INVENTION

In view of the foregoing, it is an object of this invention to provide apparatus and methods that permit a user to seamlessly and dynamically switch between Internet-based telephony service and PSTN-based telephony service.

It is also an object of the present invention to provide apparatus and methods that enable a standard analog telephone circuit to be selectively connected to either the PSTN network or an Internet-based telephony service.

It is a further object of this invention to provide apparatus and methods that detect the presence of PSTN network service and provide either the PSTN network dial tone or a synthesized dial tone when handset is taken off-hook.

It is another object of this invention to provide apparatus and methods, useable in conjunction with call-waiting capable modems, that enable a user to receive a call-waiting signal and switch between Internet-based telephony service and PSTN-based telephony service.

It is also an object of the present invention to provide apparatus and methods that enable a user to receive a ring signal and switch between Internet-based telephony service and PSTN-based telephony service.

It is yet another object of the present invention to provide apparatus and methods that enable a user to seamlessly switch between Internet-based and PSTN-based telephony service using a device that incorporates a microprocessor and modem, and optionally, an analog telephone circuit.

These and other objects of the present invention are accomplished by providing a hardware or software switch adapted to selectively couple a standard analog telephone circuit to either a suitably equipped personal computer (or other computing machine capable of accessing the Internet, such as Internet appliances) or the PSTN network. By activating a feature of the device, e.g., using a predetermined sequence of DTMF digits or by pressing a button, the switch permits the analog telephone circuit to be used with either an Internet-based telephony service or PSTN-based telephone service.

In a first embodiment, the switch comprises an external computer peripheral module that may be coupled to standard analog telephone circuit (e.g., a standard analog telephone) and to the computing device using a parallel or serial port, or connection to a Universal Serial Bus (USB). Alternatively, the computer peripheral module may take the form of an internal computer card that is connected a standard analog telephone circuit and to the system bus of the computing device using, for example, a PCI or ISA expansion card slot. In this embodiment, the module preferably includes at least a DTMF interface circuit, a subscriber line interface circuit and a switch movable between a first position, wherein the analog telephone circuit is coupled to the PSTN network, and a second position, where the analog telephone circuit is coupled to the computing device.

In a second embodiment, a specialized telephone is provided that combines the switch of the first embodiment with key components of the computing device, such as the modem and microprocessor, and the analog telephone circuit. In this embodiment, the specialized telephone includes a button that may be used by the caller to toggle between Internet-based and PSTN-based telephony services, without dropping the other call.

In yet a third embodiment, an alternative specialized module is provided, suitable for connection to a standard analog telephone, that incorporates the switch of the first embodiment and the basic components of a computing device needed to establish and maintain an Internet connection, such as a microprocessor, associated hardware, and modem.

In accordance with the methods of the present invention, the apparatus is programmed with software routines to control operation of the switch. The software preferably includes user-selectable settings including, for example, the default mode of operation (either PSTN network or Internet service), the telephone number for dialing into the Internet based service and appropriate log-in/password information. The software also includes routines for switching between modes of telephony service, as well the capability to handle call-waiting and second-line operation of the telephone.

BRIEF DESCRIPTION OF THE DRAWINGS

Additional objects and advantages of the invention will be apparent from the following description, the accompanying drawings and the appended claims, in which:

DETAILED DESCRIPTION OF THE INVENTION

Figure 1:
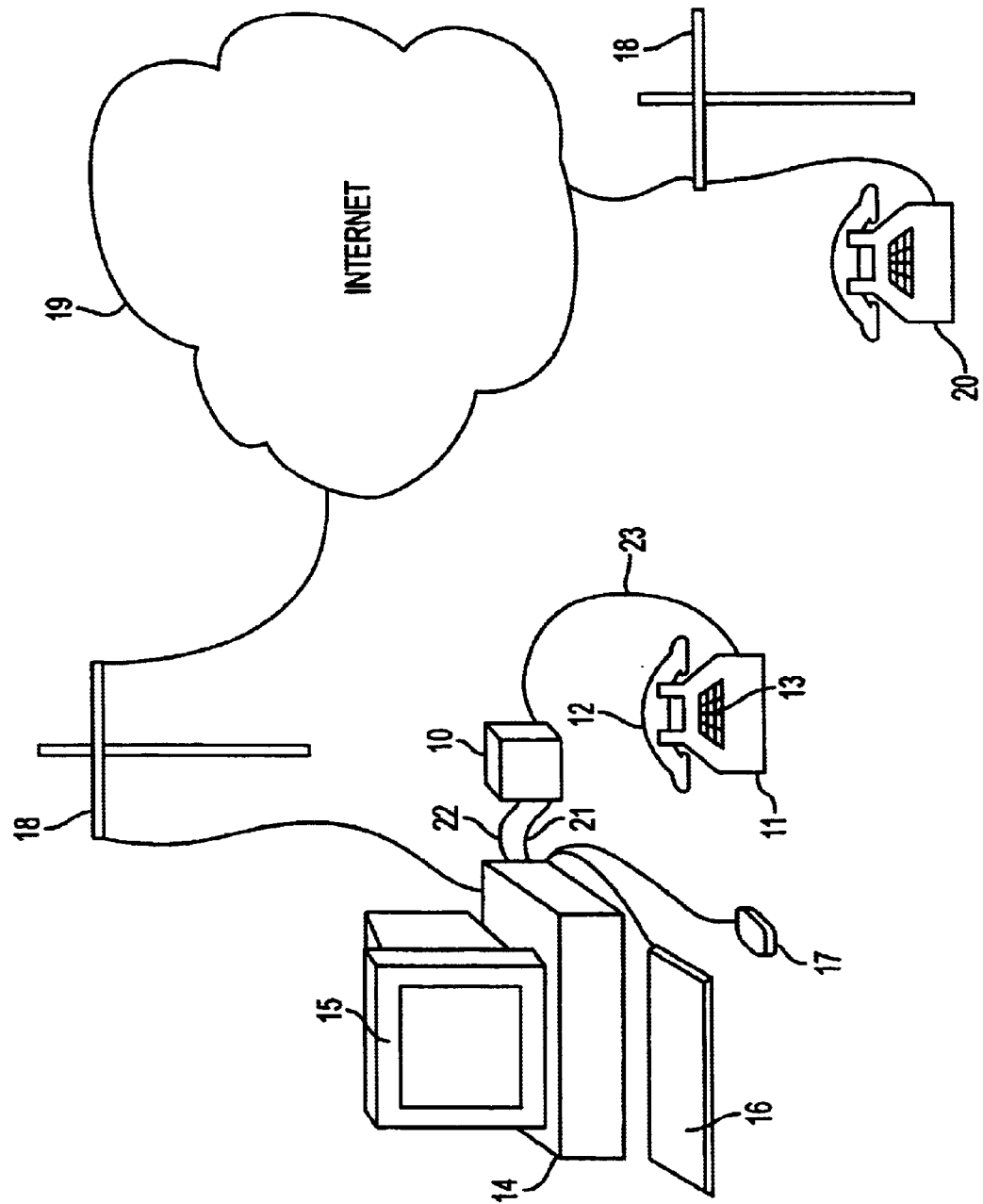
FIG. 1 is a schematic view showing use of the apparatus of the present invention to selectively place and receive calls from either the Internet or the PSTN network.

The apparatus and methods of the present invention permit a user to selectively place or receive a telephone call using either the PSTN network or an Internet telephony service, using a standard analog telephone circuit and a personal computer or Internet appliance equipped with a sound card, microphone, speaker and modem. As used herein, a "PC" refers not only to a previously known personal computer having a sound card, speakers, and modem, but also to any and all other computing devices capable of establishing a connection to the Internet to transmit and receive VOIP data transmissions, such as Internet appliances. Further, as used in this written description, the term "analog telephone circuit" and "analog telephone" are interchangeable and refer to previously known analog telephone circuits such as are used in conventional telephones, whether or not embodied in the form of a previously known telephone receiver and handset.

In accordance with the present invention, the user may place an out-going call with either the PSTN network or an Internet-based telephony service, may receive an incoming call from either network when already engaged in an out-going call, and may toggle between calls placed on either or both networks where a second PSTN line is available. Advantageously, a first embodiment of the present invention does not require that the user purchase a specialized, limited-use telephone, as in previously known methods, and offers a virtually unlimited choice of Internet telephony service providers. Additional embodiments include specialized modules, either with or without a standard analog telephone circuit, that permit the user to establish telephone calls over either the Internet or PSTN network without coupling the module to a separate computing device.

In particular, the present invention provides a system, including hardware and bundled software, that allows connection of a standard analog phone to a PC and which permits the telephone to be used selectively to place and receive either PSTN or Internet-based telephone calls. In one embodiment, the apparatus permits the use of a short series of keystrokes input using the telephone dial pad, e.g., "##", "**", "*#" or "#*", to toggle between the PSTN network and Internet telephony service. The apparatus of the present invention may be implemented in any of several form factors, including an external computer peripheral adapted for connection to a PC via known parallel, serial or USB ports, or an internal card adapted to engage an expansion slot on the PC motherboard. Depending upon the implementation chosen, the apparatus may include a microprocessor controller, or may rely upon the central processing unit and/or modem of the PC to handle certain of the call processing functions.

In an alternative embodiment, the present invention surpasses previously known special-purpose telephones by offering the capability to toggle between active calls on both the Internet and PSTN services, and the capability to handle call-waiting traffic.

Referring now to FIG. 1, a first embodiment of the apparatus and methods of the present invention are described suitable for use with previously known PCS to enable telephone calls to be placed and received selectively using either the PSTN network or the Internet. Apparatus 10 of the present invention is shown connected to standard analog telephone set 11 having handset 12 and dial pad 13, and previously known PC 14 having monitor 15, keyboard 16 and mouse 17. PC 14 includes an internal modem for dialing into Internet 19 via PSTN network 18, as is well known. Telephone 20, which includes a standard analog telephone circuit, is connected to PSTN 18, and may in addition be connected to Internet 19 via an Internet gateway and a previously known Internet telephony service provider, such as that provided by Net2phone, Inc.

Apparatus 10 is coupled to a data port of PC 14 via data cable 21. Where the user has a single telephone line from the PSTN network, apparatus 10 is coupled to the telephone jack of the internal modem of PC 14 via cable 22; where two separate PSTN lines are available (e.g., two separate telephone numbers), a first line may be coupled to the internal modem of PC 14, while the second line may be coupled directly to apparatus 10 using cable 22, for the purposes described hereinafter.

Apparatus 10 is coupled to telephone 11 via standard two wire telephone cable 23. In accordance with the present invention, apparatus 10 permits telephone 11 to be used to place or receive calls over either PSTN 18 alone, or using PC 14, over Internet 19, as described in detail hereinafter. As will of course be apparent, apparatus 10 may be used to place/receive calls not only over Internet 19, but in addition may be used for placing calls over any wide-area network supporting telephony using Voice Over Internet Protocol ("VOIP").

Figure 2:
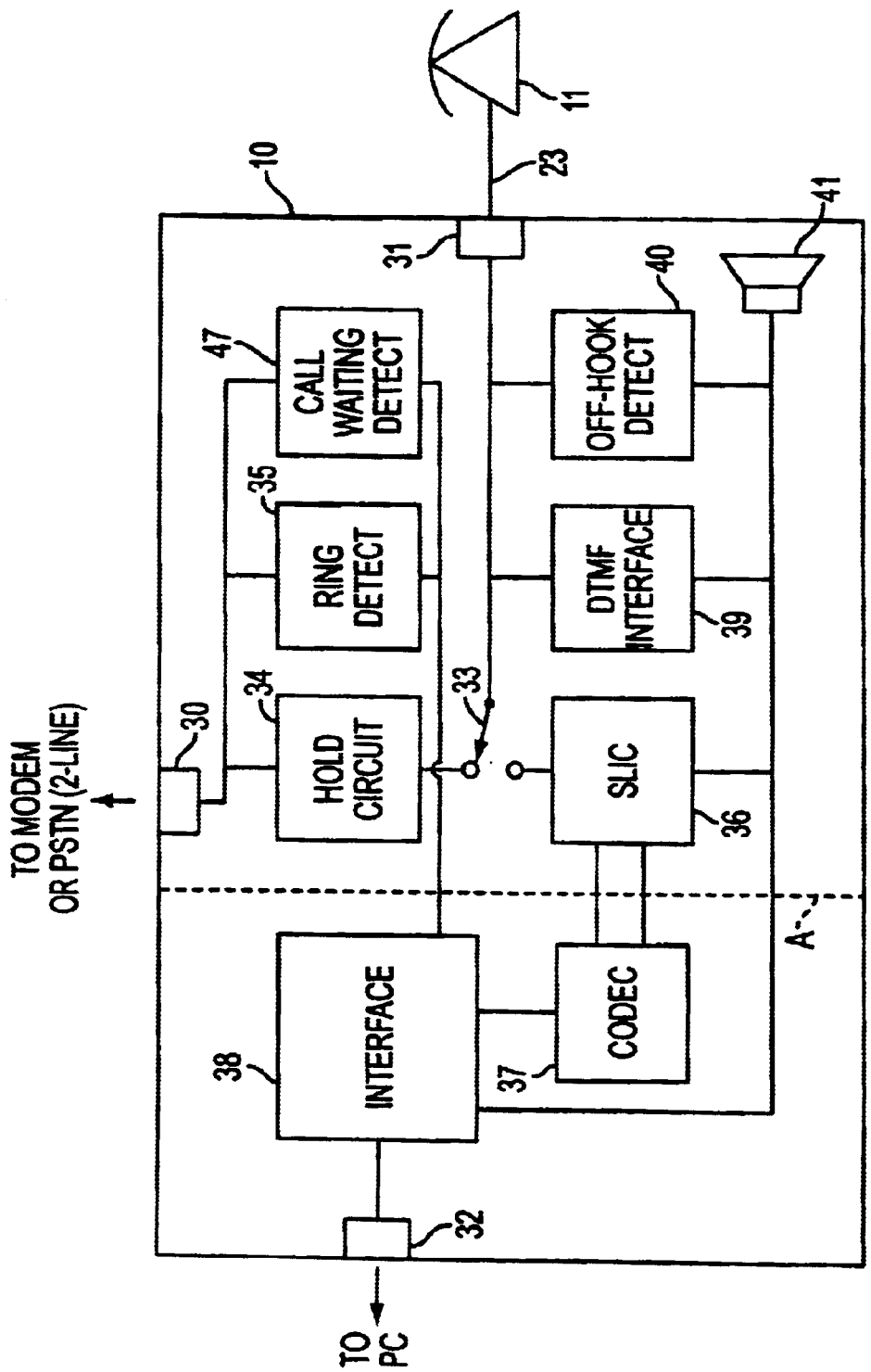
FIG. 2 is a schematic view of the internal components of a first embodiment of the apparatus of the present invention.

Referring to FIG. 2, a schematic diagram depicting a simplified internal structure for a first embodiment of apparatus 10 is described. FIG. 2 shows, to the right of dotted line A, the basic components of the switch of the present invention, while the components to the left of dotted line A depict elements typically expected to be used to implement the apparatus. As will be apparent later in this written description, it may be desirable to include other circuits to enhance usability of the invention.

Apparatus 10 includes jack 30 for accepting cable 22 coupled to the telephone pass-through jack of the internal modem of PC 14 (where a single PSTN line is available) or directly to the PSTN network (where two lines are available). Jack 31, e.g., a standard RJ-11 jack, accepts cable 23 coupled to telephone 11; data port 32 accepts data cable 21 from PC 14. Jack 31 is connected to switch 33, which toggles between a first position wherein telephone 11 is coupled to jack 30 through hold circuit 34 and ring detect circuit 35, and a second position, wherein telephone 11 is coupled to data port 32 through subscriber line interface circuit ("SLIC") 36, optional CODEC 37, and interface circuit 38. DTMF interface circuit 39, off-hook detection circuit 40 are coupled between jack 31 and interface 38, while speaker 41 is coupled to interface 38. SLIC 36, which may be built from discrete components, provides at least the functionalities of battery feed and hybrid, and more preferably, also provides overvoltage protection, ringing, supervision, and test functions, such as current limiting, on-hook transmission, polarity reversal tip open and loop current detection. Optionally, apparatus to include apparatus 10 that, if the user is engaged in an Internet-based telephone call, generates a call waiting signal that alerts the user of the presence of an incoming call on the telephone line coupled to jack 30.

The foregoing components cooperate as follows to achieve the objectives of the present invention: DTMF interface circuit 39 monitors telephone 11 for input of a predetermined sequence of DTMF digits, such as "##", "**" or "#*", and reports the occurrence of digits to interface 38 or an on-board DSP, if present. DTMF interface circuit may comprise a DTMF detection circuit. Off-hook detection circuit 40 detects when telephone 11 is off-hook and also reports that information to interface 38. Interface 38 controls the position of switch 33 responsive to the information provided by off-hook detection circuit 40 and DTMF interface circuit 39, and may be coupled to a serial, parallel or Universal Serial Bus of PC 14. Interface 38 also may comprise a portion of a modem circuit.

Accordingly, if apparatus 10 is set to PSTN network calling for use as a standard analog telephone (hereinafter "A-phone" mode) as the default, switch 33 will be coupled to jack 30, and the dialtone from the telephone company will be provided to telephone 11 when it is taken off-hook. If the predetermined sequence of DTMF digits is not input using the telephone dial pad, the telephone will remain in A-phone mode.

If, on the other hand, the user desires to place a Internet-based telephone call ("I-phone" mode), the user presses the predetermined sequence of DTMF digits on the telephone dial pad, which are detected by DTMF interface circuit 39. When those digits are reported to interface 38, interface 38 (if it includes a microcontroller) or the central processor unit ("CPU") of PC 14 then instructs switch 33 to toggle to couple telephone 11 to SLIC 36 for use as an I-phone. SLIC 36 may comprise, for example, PEB 4266 integrated circuit available from Infineon Technologies AG, Munich, Germany, and provides at least the basic analog line interface functions described hereinabove. The output of SLIC 36 is passed to coding/decoding ("CODEC") circuit 37 and is digitized for transmission through interface 38 to the PC.

As depicted in FIG. 2, apparatus 10 may advantageously be used to toggle between calls on each of two lines where the user has two PSTN network lines. It is increasingly common for homes to have two PSTN network lines, each line having a separate telephone number, where a first line is coupled to the modem of PC 14 for data communication and the second line is used for voice communications. In this instance, apparatus 10 is indirectly coupled to the first line through the modem of the PC via data port 32, whereas the second PSTN line is coupled directly to jack 30.

If the user is engaged in an I-phone mode telephone call (using PC 14, apparatus 10 and telephone 11), an incoming call on the second line will be detected by ring detection circuit 35, and reported to interface 38. Interface 38 alerts the user to the presence of the call on the second line by generating a user-perceptible signal, such as a tone or ringing sound on speaker 41, or displaying a message on the display of PC 14. If the user desires to pick up the incoming call on the second line, the user inputs the predetermined sequence of DTMF digits using the telephone dial pad, and apparatus 10 moves switch 33 to couple telephone 11 to the second line.

While switched to the second line, the modem of PC 14 will put the I-phone call on the first line on hold (up to the time-out limit of the modem). If the user wishes to toggle back to the I-phone call, he or she again inputs the predetermined sequence of DTMF digits, causing apparatus 10 to again change the position of switch 33. Hold circuit 34, which is per se known, keeps the call on the second line from being dropped until the user chooses to again toggle back to the second line and continue that conversation.

Figure 3:
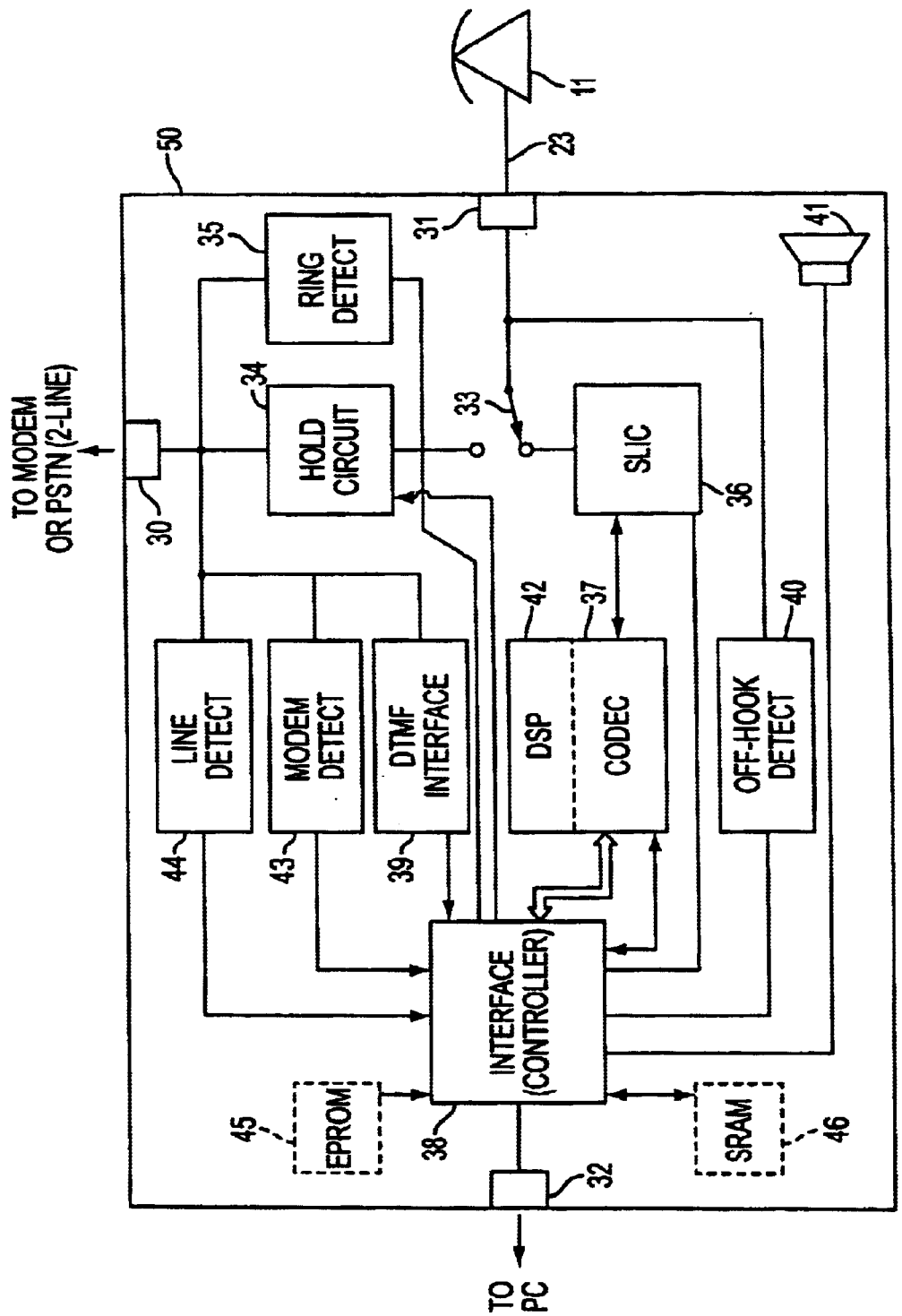
FIG. 3 is a schematic view of the internal components of a preferred implementation of the first embodiment of the apparatus of the present invention.

Referring now to FIG. 3, an implementation of the apparatus of the present invention suitable for commercialization is described. Apparatus 50 includes all of components 30–41 described above with respect to the embodiment of FIG. 2, although in this embodiment the DTMF interface circuitry is coupled between jack 30 and interface 38, rather than between jack 31 and interface 38. Accordingly, in the embodiment of FIG. 3, DTMF detection in the I-phone mode of operation (when switch 33 is coupled to SLIC 36) may be done either by digital signal processor ("DSP") 42 or the CPU of PC 14.

Apparatus 50 further includes modem detection circuit 43, line detection circuit 44, and if interface 38 includes a microcontroller, EPROM 45 and SRAM 46. Modem detection circuit 43 detects whether the modem of the CPU is active and reports that information to interface 38. If the modem of the computer is already active when the handset of telephone 11 is taken off-hook, interface 38 (or the CPU of the PC) instructs switch to couple telephone 11 to SLIC 36, on the assumption that an Internet-based telephone call will be made. Line detection circuit 44 detects whether a physical line is coupled to jack 30, and if not, puts apparatus 50 in a default mode of I-phone operation.

If interface 38 includes a microcontroller, EPROM 45 preferably is provided, for example, for storing a USB identifier, and SRAM 46 is provided for storing configuration parameters and firmware for controlling operation of apparatus 50. In a preferred embodiment, DSP42/CODEC17 comprises the PEB 3265 integrated circuit, also available from Infineon Technologies AG, in which the DTMF detection and modem detection are implemented using the second channel of the integrated circuit.

Operation of apparatus 50 is similar to that described above with respect to the embodiment of FIG. 2, in both single PSTN line and two PSTN line arrangements. When switch 33 is coupled to SLIC 36, components 37 and 42 convert and compress the signals from analog telephone 11 to digital signals suitable for transmission by interface 38 to PC14. Components 37 and 42 also convert digitized speech signals received from PC 14 into analog signals suitable for transmission to telephone 11. As will of course be understood by one of ordinary skill, the interface, DSP and CODEC of the present invention are selected to provide full duplex voice capabilities during I-phone operation of telephone 11.

In one preferred embodiment of apparatus 50, interface controller 38 is a USB controller. Alternatively, interface 38 may include any controller suitable for transferring digitized data from apparatus 50 to PC 14 using an available serial or parallel port of PC 14, or may be omitted entirely.

Apparatus 50 also preferably is bundled with application software, executable on PC 14, to load and configure certain parameters used by apparatus 50. For example, the user may download configuration parameters stored in SRAM 46 (if present) from PC 14 to configure apparatus 50 to default to either PSTN-based calling or Internet-based calling when the handset is taken off-hook. Other parameters, such as the Internet telephony application to be launched when an Internet-based call is to be made, and the telephone number to be used to access the Internet gateway, may be stored in PC 14.

Figure 4:
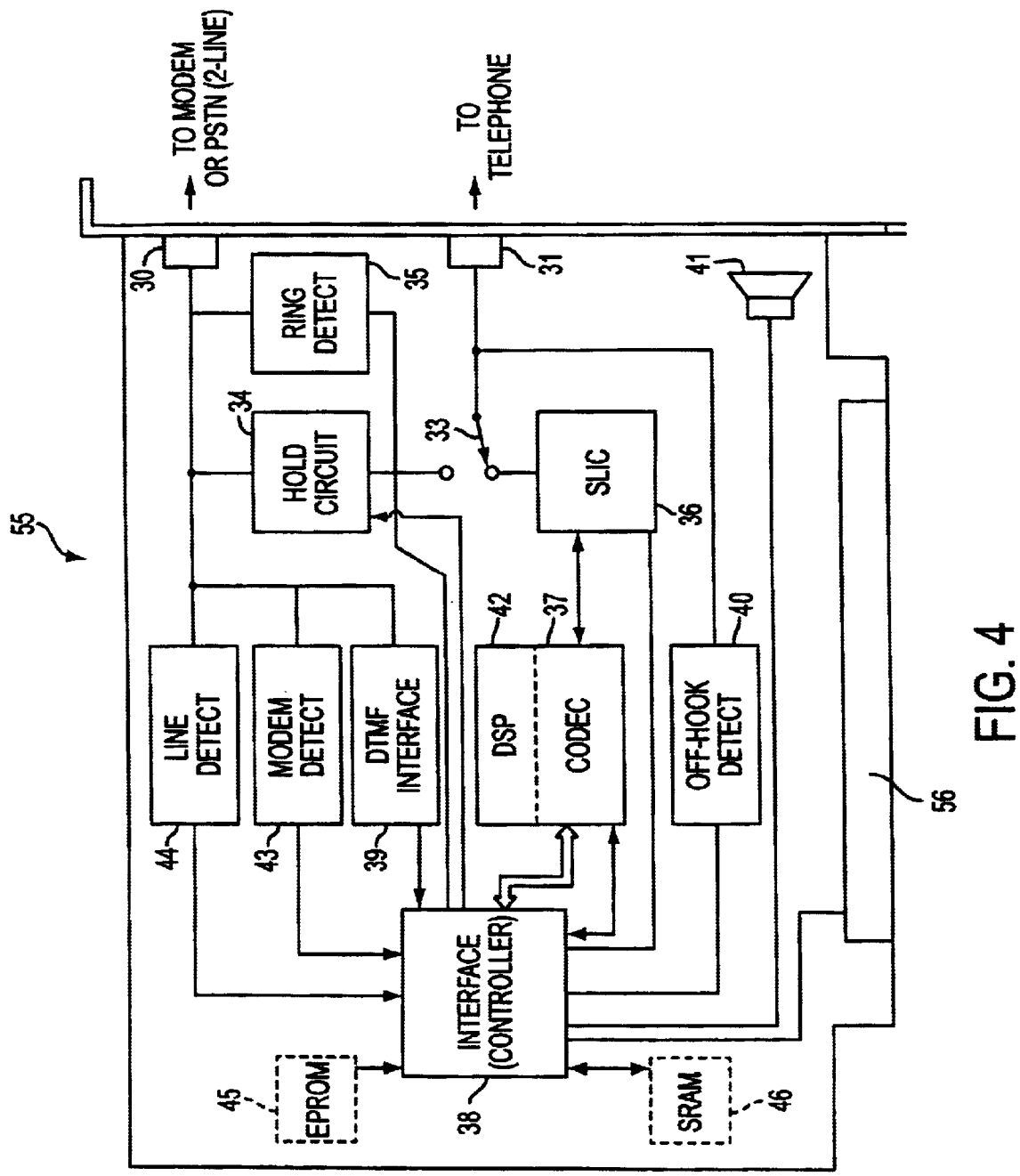
FIG. 4 is a schematic view of the internal components of an alternative embodiment of the apparatus of the present invention having an expansion slot form factor.

Referring now to FIG. 4, an alternative embodiment of the apparatus of FIG. 3 is described, in which the apparatus has the form factor of an internal card suitable for connection to an expansion slot on the motherboard of PC 14, e.g., a PCI or ISA-compatible card. Internal card 55 includes jacks 30 and 31, switch 33 and components 34–42 as described hereinabove for the embodiment of FIG. 3. Internal card 55 differs from the embodiment of FIG. 3 in that edge connector 56 is substituted for jack 32. As in the previous embodiments, interface circuitry 38 may omit the microcontroller and instead rely on the CPU of PC 14 to handle data transmission to and from internal card 55. Interface circuitry 38 also may comprise a portion of a modem circuit or sound card 55. Operation of the internal card is identical to that described for the embodiment of FIG. 3.

The apparatus of the present invention advantageously may be used with a PC modem having a call-waiting feature, such as the Call-Waiting Modem, offered by the assignee of the present application, ActionTec Electronics, Inc., Sunnyvale, Calif. Such modems allow a call-waiting signal generated by a telephone company to be received by a PC connected to the Internet, and allow the PC user to accept the incoming telephone call.

In accordance with the principles of the present invention, the apparatus of the present invention may be used in conjunction with a call-waiting modem to toggle an analog telephone coupled to a PC between an Internet-based telephone call and a PSTN network-based incoming call, without terminating or dropping either call. For example, if the user is engaged in an Internet-based call and receives a call-waiting signal for an incoming PSTN call, the user may first switch the telephone to A-phone operation by inputting the predetermined sequence of DTMF digits, and thereafter (according to the call waiting modem instructions) switch to the incoming call. The user may thereafter switch between the Internet-based call and the PSTN-based call as desired.

Figure 5:
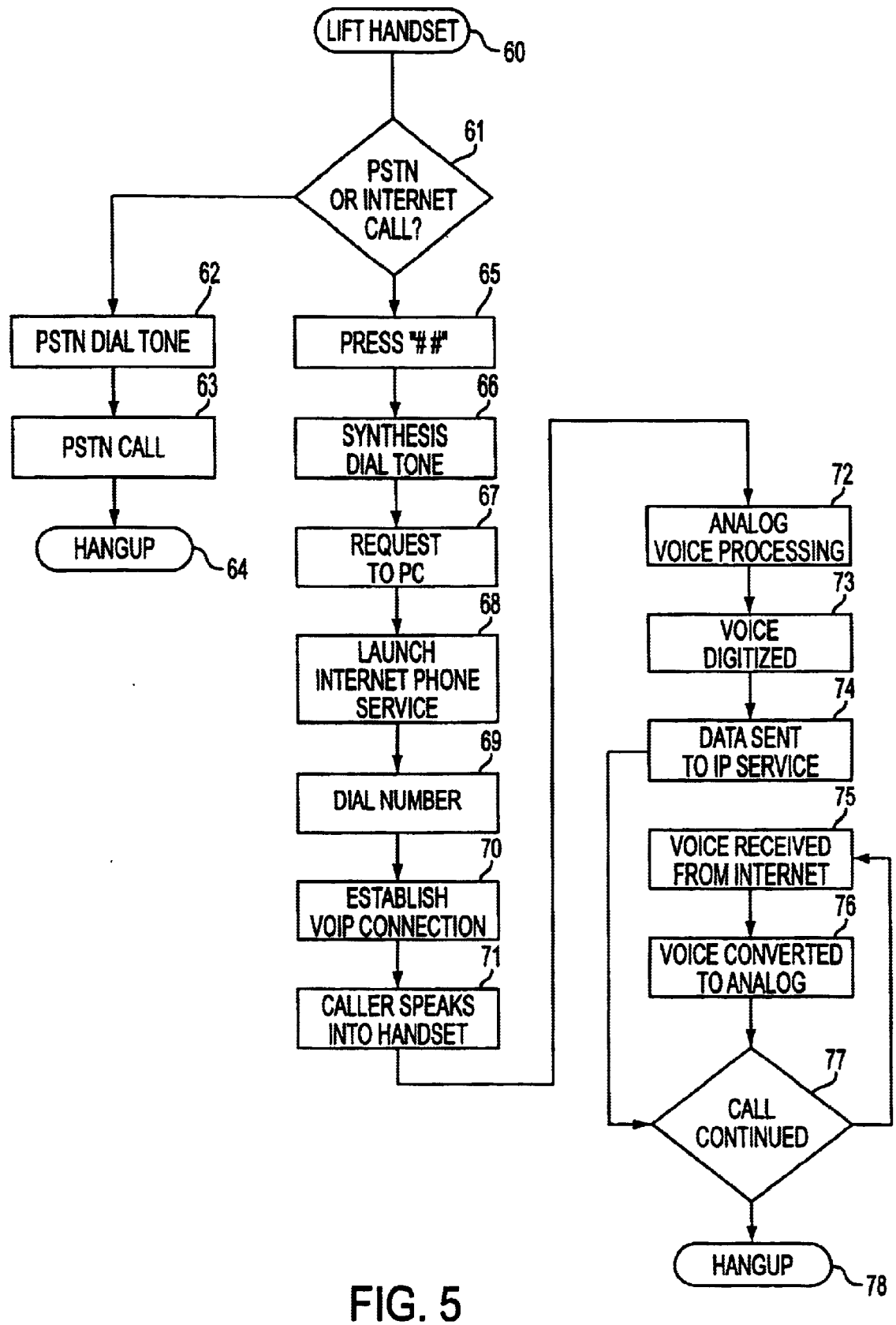
FIG. 5 is a flow diagram depicting operation of the apparatus of the present invention during placement of telephone call.

Referring now to FIG. 5, a flow diagram describing operation of the embodiments of FIGS. 2 and 3 is described. In FIG. 5, it is assumed that the apparatus of the present invention is connected to a data port/bus of PC 14, a previously known analog telephone, and either the PSTN pass-through jack of the PC modem (as in FIG. 1) or a separate second line. To initiate a telephone call, the user lifts the handset at step 60, and at step 61, decides whether to place a telephone call using either the PSTN network or an Internet-based telephony service. If the telephone is set to use of the PSTN network as the default, after obtaining the PSTN dialtone, step 62, the user dials a desired telephone number to place a call over the PSTN network, step 63. Upon completion of the call, the user replaces handset 12 back on telephone 11 to hang up the call (step 64).

If, on the other hand, the user desires to place a call using an Internet telephony service, the user presses the predetermined sequence of DTMF digits, e.g., "##" on the dial pad of the telephone, step 65. Modem/DTMF detector 39 detects this special series of keystrokes, and switch 33 is closed so that the telephone is coupled to SLIC 36. If, on the other hand, modem detection circuit 43 detects that the modem is already active, then switch 33 is set to I-phone mode without the need to input the DTMF digits.

SLIC 36 then generates a dialtone, at step 66, which is preferably audibly different to the user, to let the user know that the phone has been toggled to Internet-based telephony service. Off-hook detector 40 also causes interface 38 to initiate a request to PC 14, step 67, to launch Internet telephony application at step 68. If PC 14 is not already connected to the Internet, launching of the Internet telephony application will cause PC 14 to dial into Internet 19 via a local gateway on PSTN 18. In alternative embodiments, the apparatus may include circuitry and software for waking up the computer if it is in a powered-down or "sleep" mode.

Once the Internet telephone application is running on PC 14, the user enters the called party's telephone number using dial pad 13 of telephone 11. The dialed number is detected by DTMF interface circuit 39, and digitized data corresponding to the DTMF tones is passed to PC 14 via interface 38. This data is then used by the Internet telephony application and server-based application at the Internet telephony service provider (part of Internet 19) to establish a VOIP connection, at step 70, through Internet 19 with the called party's telephone 20 (see FIG. 1).

When the call is answered, either by the called party or his or her answering machine, the user speaks into the mouth piece of handset 12 at step 71. The analog voice signal is processed by SLIC 36, at step 72, and converted to digital data using DSP 42 and CODEC 37, at step 73. The digitized and compressed voice signal is passed to PC 14 via interface 38 at step 74 for transmission over Internet 19 to called telephone 20. Speech from the called party, step 75, may be simultaneously transmitted via Internet 19 to PC 14. This digitized data then is passed to DSP 42 and CODEC 37, and converted for transmission to telephone 11, at step 76. As will of course be understood, the apparatus of the present invention supports a full duplex mode of voice communication using the Internet.

The call continues with voice communications between the user and called party being transmitted as described at steps 71 to 76 until the call is completed, step 77. When the call has been completed, the user hangs up, step 78, and off-hook detection circuit 40 signals interface controller 38 to request that PC 14 terminate the Internet telephony application running on PC 14.

Figure 6:
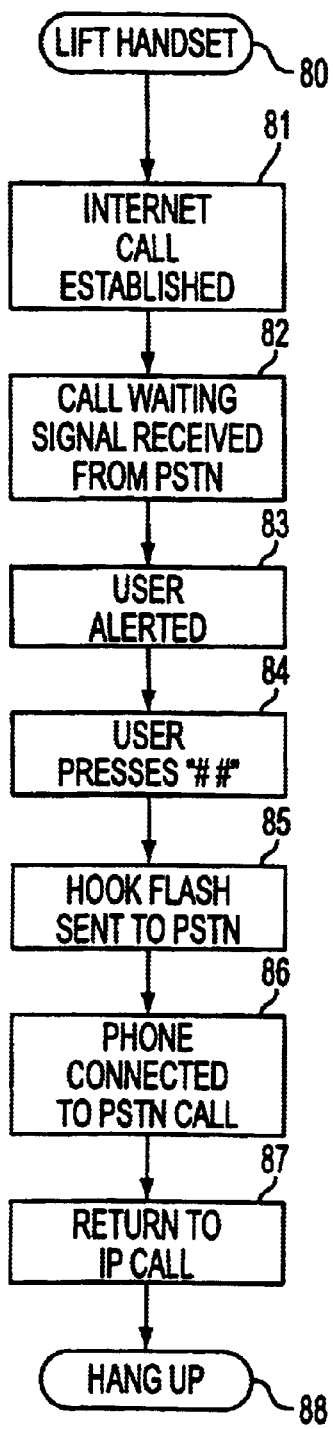
FIG. 6 is a flow diagram depicting operation of the apparatus of the present invention in response to detection of a call waiting signal received from the PSTN network.

Referring now to FIG. 6, operation of the apparatus of the present invention with a single PSTN line and call waiting modem is described. In this case, the user has already lifted the handset, step 80, and established an Internet-based telephone call, step 81, in accordance with the steps described in FIG. 5. At step 82, during the pendency of the Internet-based call, the user receives a call waiting signal from PSTN 18, indicating an incoming call. The call waiting modem detects the call waiting signal and alerts the user to the presence of the incoming call, at step 83, with a user-perceptible signal, e.g., by generating an audible tone using speaker 41 or the speaker on the internal modem of PC 14, or displaying a message on the display of PC 14.

At step 84, the user presses "##" on dial pad 13 of telephone 11 to toggle the telephone from the Internet-based call to the incoming call. In accordance with the call waiting modem operating instructions, the user notifies the telephone company that the incoming call will be accepted, step 85. At step 86, the telephone is connected to the incoming call, and the modem puts the Internet-based call on hold (up to its predetermined time-out period). If the user completes the incoming call within the time-out interval of the modem, the user may then press "##" again on the telephone dial pad to return to the Internet-based call, at step 87. Once the Internet-based call is completed, the call is terminated, at step 88, as described hereinabove with respect to call termination in FIG. 5.

Figure 7:
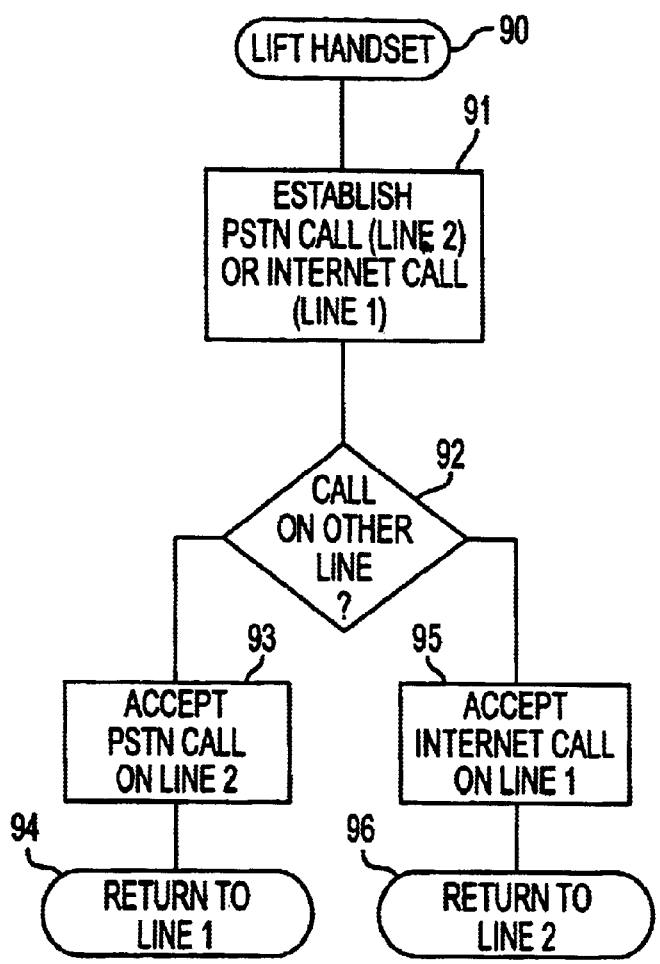
FIG. 7 is a flow diagram depicting operation of the apparatus of the present invention where a second line to the PSTN network is available.

Referring to FIG. 7, operation of the apparatus of the present invention in a two line arrangement is now described. In this case, a first telephone network line from the PSTN network, having a first telephone number, is coupled to the modem of PC 14, and a second telephone network line from the PSTN network, having a second telephone number, is coupled to jack 30. To place a telephone call using the Internet, the user lifts handset, step 90, and establishes a telephone call on the first line at step 91 in accordance with the steps 65–77 of FIG. 5.

If the user receives an incoming call on the second line, ring detect circuit 35 informs interface 38, which in turn notifies the user of the presence of the second call via speaker 41. The user then may press the predetermined sequence of DTMF digits on the telephone dial pad, thereby causing switch 33 to couple the telephone to jack 30 to receive the incoming call on the second line, step 93. When the call on the second line is completed, the user toggles the phone to Internet-based mode, by pressing "##" on the telephone dial pad, and returns to the Internet call previously established on first line, step 94.

If, on the other hand, the user receives an incoming call on the first line (and subscribes to a call waiting service and has a call waiting modem), then the user can accept the incoming Internet-based call in accordance with steps 85–87 of FIG. 6. Because switch 33 is already set for Internet-based telephony service, the user need not input the predetermined sequence of DTMF digits.

Still referring to FIG. 7, the user instead may choose to place a telephone call using the PSTN network. In this case, the user lifts the handset, step 90, and establishes a telephone call on the second line, step 91, in accordance with the steps 62 and 63 of FIG. 5. If the user receives an incoming call on the first line, interface 38 notifies the user of the presence of the incoming call via speaker 41. The user then may press the predetermined sequence of DTMF digits on the telephone dial pad, to cause switch 33 to couple the telephone to SLIC 36 to receive the incoming Internet call on the first line, step 95. Hold circuit 34 ensures that the PSTN-based call on the second line is not dropped while the Internet call is accepted. When the call on the first line is completed, the user toggles the phone to PSTN-based mode, by pressing "##" on the telephone dial pad, and returns to the PSTN call previously established on second line, step 96.

Figure 8A:
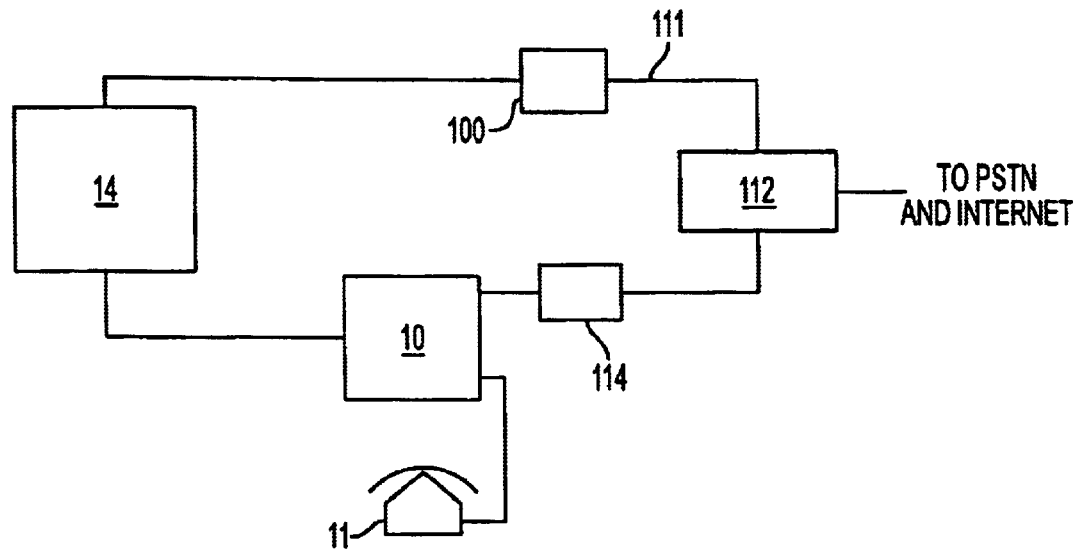
FIGS. 8A–8C are schematic views showing connection of the apparatus of the present invention to personal computers having access to the Internet via DSL, cable and ISDN services, respectively.
Figure 8B:
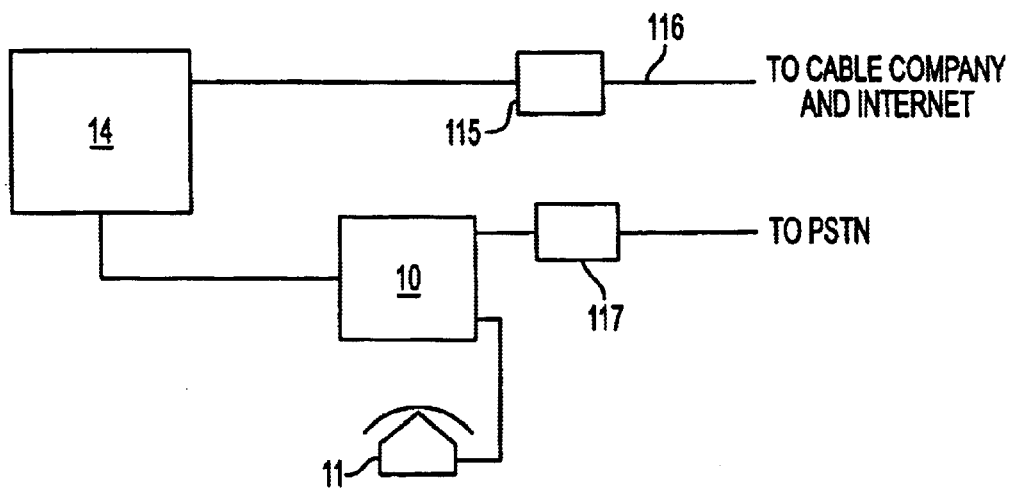
Figure 8C:
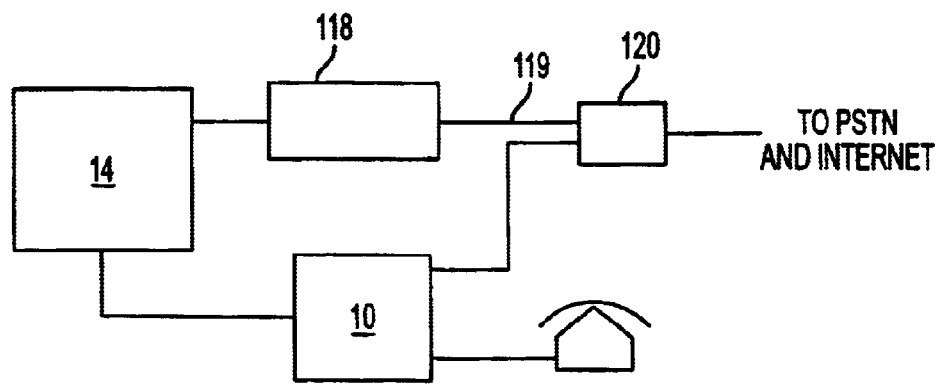

Referring now to FIGS. 8A to 8C, use of the apparatus of the present invention in contexts other than analog-based modems is described. In FIG. 8A, the apparatus of the present invention is coupled to telephone 11 and PC 14. PC 14 is coupled to PSTN 18 and Internet 19 via DSL modem 100, cable 111 and splitter 112. The inventive apparatus also is coupled to PSTN network 18 using standard telephone jack 114 and splitter 112. Operation of the system depicted in FIG. 8A is similar to that described for the embodiments of FIGS. 1–4, except that Internet-based telephone calls are routed through PC 14 and DSL modem 100. As will of course be understood by one of ordinary skill, DSL modem 100 may be a splitter-less DSL modem, in which splitter 112 is omitted and microfilters optionally are instead installed on the analog telephones to filter out transients induced by the analog telephone.

In FIG. 8B, the inventive apparatus is coupled to telephone 11 and PC 14. PC 14 is coupled to Internet 19 via cable modem 115 and cable line 116. Cable modem 115 is connected to the Internet via a gateway accessible to the cable modem head end. The apparatus also is coupled to PSTN network 18 using standard telephone jack 117. Operation of the system depicted in FIG. 8B is similar to that described for the embodiments of FIGS. 1–4, except that Internet-based telephone calls are routed through PC 14 and cable modem 115.

In FIG. 8C, the inventive apparatus again is coupled to telephone 11 and PC 14. PC 14 is coupled to PSTN 18 and Internet 19 via ISDN modem 118, ISDN line 119 and jack 120. The apparatus also is coupled to PSTN network 18 using jack 120. Operation of the system depicted in FIG. 8C again is similar to that above-described embodiments, except that Internet-based telephone calls are routed through PC 14 and ISDN line 119.

Figure 9A:
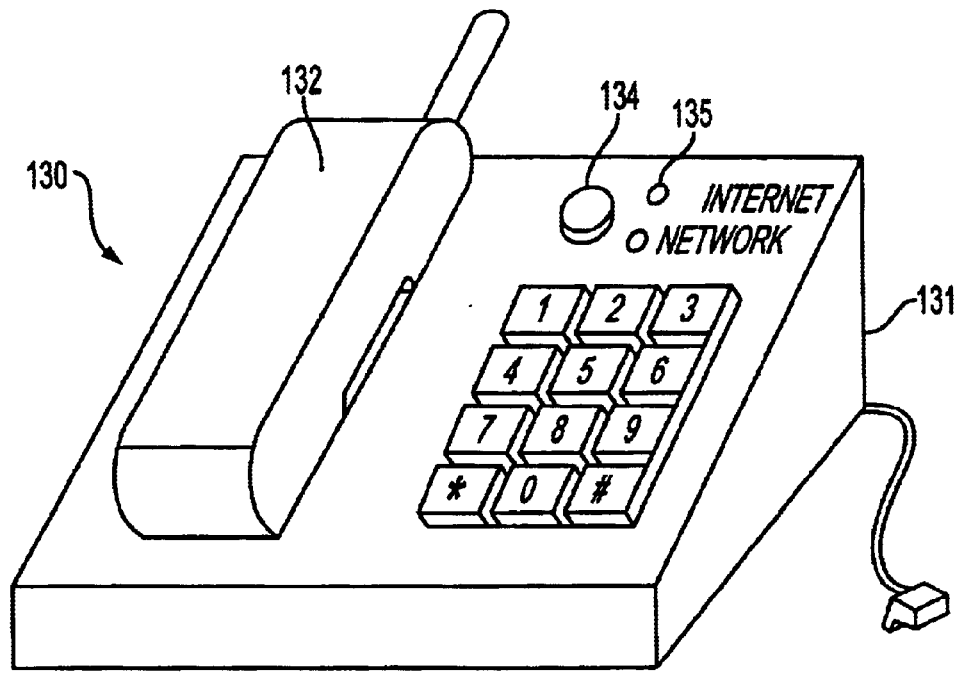
FIGS. 9A and 9B are, respectively, a perspective view and a schematic diagram of a second embodiment of the apparatus of the present invention in the form of a specialized telephone.
Figure 9B:
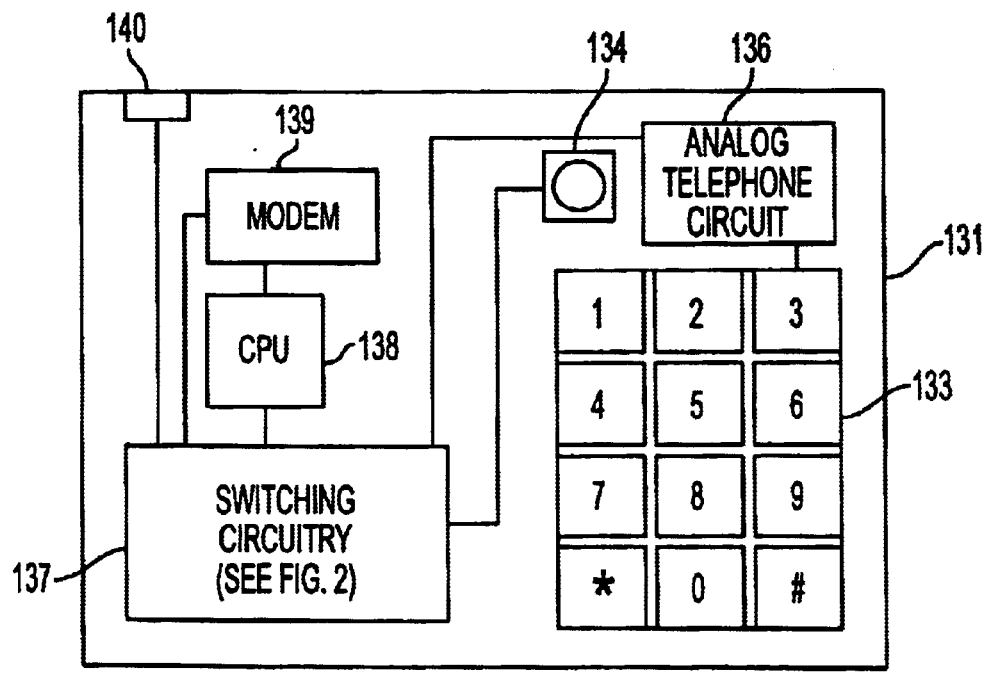

Referring now to FIGS. 9A and 9B, a second embodiment of the apparatus of the present invention is described. This embodiment combines the switching circuitry of the present invention into a specialized telephone suitable for placing and receiving either Internet-based or PSTN-based telephone calls, including toggling between such calls, simply by pressing a button. Telephone 130 illustratively comprises base station 131 that communicates with wireless handset 132 using technology that is per se known. As is conventional, each of base station 131 and handset 132 includes dial pad 133. In accordance with the principles of the present invention, each of base station 131 and handset 132 includes button 134 for toggling the telephone between PSTN and Internet-based telephone service. Telephone 130 also preferably includes LEDs 135 that indicate whether the phone is set for PSTN or Internet-based telephony service.

In FIG. 9B, a schematic diagram of the internal components of base station 131 of telephone 130 is described. Telephone 130 includes dial pad 133, button 134, analog telephone circuit 136, switching circuit 137, microprocessor 138 and modem 139. Telephone 130 also comprises RF circuitry (omitted for clarity in FIG. 9B), which is per se known, so that handset 132 can communicate with base station 131.

Analog telephone circuit 136 comprises previously known circuitry for generating analog telephone signals from voice, and for converting analog telephone signals to audible speech. Microprocessor 138 is programmed with suitable software stored in non-volatile memory (not shown), such as SRAM and/or EEPROM, and is capable of packaging digitized speech signals for transmission over the Internet using a VOIP protocol. Modem 139 is coupled to microprocessor 138 for transmitting the data received from microprocessor 138, and for transmitting received data from the Internet back to microprocessor 138. Preferably, modem 139 includes a call waiting feature, so that the modem can alert the user to the presence of an incoming call.

In accordance with the principles of the present invention, switching circuit 137 comprises selected circuits employed in the embodiment of FIGS. 2–4, including at least switch 33 and subscriber line interface circuit 36, as described hereinabove. Switching circuit 137 is coupled to button 134 to receive a signal from button 134 that changes the state of the switch in switching circuit 137. A switch (like switch 33 in the embodiments of FIGS. 2 to 4) within switching circuit 137 moves between a first position wherein analog telephone circuit 136 is coupled to jack 140, for a PSTN network call, and a second position, wherein analog phone circuit 136 is coupled to jack 140 through switching circuit 137, microprocessor 138 and modem 139. In the second position, telephone 130 may be used to place a telephone call using an Internet-based telephony service, i.e., in I-phone mode.

In accordance with one aspect of the present invention, telephone 130 permits a user to toggle between an Internet-based telephone call and a PSTN network telephone call. Specifically, because telephone 130 preferably incorporates call waiting modem circuitry, it can detect a call waiting signal sent from the telephone company, and alert the user to the presence of the incoming call, e.g., using a speaker on modem 139. The user may then depress button 134 to cause switching circuit 137 to couple the analog telephone circuit to jack 140 to receive a PSTN-based telephone call. The user may then, for example, depress the hook to send a flash signal to the telephone company to indicate that the incoming call is to be coupled to the line. During that call, or after that call is completed, the user may again press button 134 to toggle the telephone call to the Internet-based telephone mode.

Figure 10A:
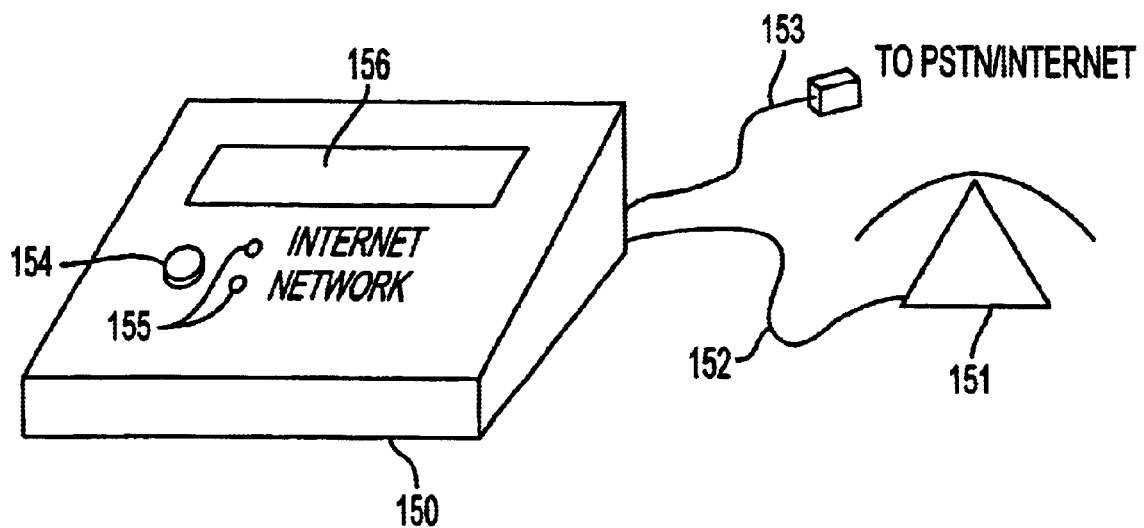
FIGS. 10A and 10B are, respectively, a perspective view and a schematic diagram of a third embodiment of the apparatus of the present invention in the form of a specialized module that includes a microprocessor and modem.
Figure 10B:
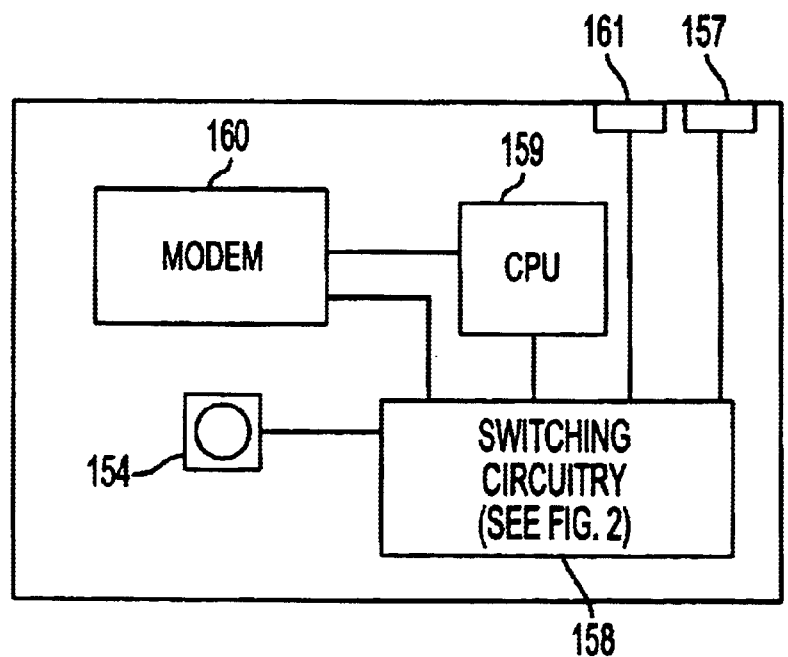

Referring now to FIGS. 10A and 10B, a third alternative embodiment of the apparatus of the present invention is described. Module 150 illustratively is coupled to standard analog telephone 151 by cable 152, and coupled to the PSTN network via cable 153. Module 150 permits telephone 151 to be selectively used in either A-phone mode (i.e., to place telephone calls via the PSTN network) or I-phone mode (i.e., to place telephone calls via the Internet), and includes optional button 154 that permits the telephone 151 to be toggled between the two modes of operation. Indicator LEDs 155 illuminate to display the status of module 150 as operating in either A-phone or I-phone mode. Optional display screen 156 may be used to display the telephone number dialed using telephone 151, to confirm data input to module 150 via the dialpad of telephone 151, or other functions, such as displaying caller ID.

With respect to FIG. 10B, module 150 includes jack 157, switching circuitry 158, microprocessor 159, modem 160 and jack 161. Jack 157 receives a standard connector (e.g., RJ-11 plug) on cable 152. Switching circuitry 158 includes selected elements of the embodiments of FIGS. 2–4, including at least switch 33 and subscriber line interface circuit 36 with the basic functionality described hereinabove with respect to FIG. 2. Microprocessor 159 includes associated hardware (not shown), such as SRAM and/or EPROM memory for storing configuration parameters and program instructions, including instructions for establishing a connection to the Internet via modem 160 and transmitting and receiving data in accordance with a VOIP protocol. Modem 160 includes standard modem circuitry and firmware, and in addition, may include call waiting detection circuitry and/or software.

Module 150 provides the same functionality as the two embodiments described hereinabove with respect to FIGS. 2–4 and 9A and 9B, by allowing a user to place a telephone call in either A-phone mode or I-phone mode, and switch between active calls. Whereas the embodiments of FIGS. 1–4 required that the user connect the apparatus of the present invention to both a computing device and an analog telephone, the embodiment of FIGS. 9A and 9B instead provides a fully integrated solution, where the necessary elements of the computing device, the switching circuitry, and analog telephone circuit are incorporated in a single unit. The embodiment of FIGS. 10A and 10B provides an intermediate, partially-integrated solution by combining the switching circuitry of the present invention with the necessary elements of the computing device. Accordingly, the embodiment of FIGS. 10A and 10B permits the user to employ a standard analog telephone, but without the need to couple the module to a previously known PC.

Operation of module 150 is as described hereinabove with respect to the previously described embodiments and FIGS. 5 through 7. In particular, the user places a call by picking up the handset of telephone 151. If it is desired to place a PSTN-based telephone call (and that is selected as the default mode of operation of module 150), the user simply dials the called party's telephone number. On the other hand, if the user desires to use telephone 151 to place an Internet-based call, the user presses button 154 to place the telephone in I-phone mode. Microprocessor 159 is awakened and establishes a connection via modem 160 to an Internet telephony service. Once the Internet connection is established, the user inputs the called party's number, and continues with the call in accordance with the operating instructions for the Internet telephony service.

If modem 160 includes a call waiting feature, it may detect a call waiting signal generated by the telephone company and alert the user to the presence of the incoming call. The user then may accept the incoming call, for example, by inputting a predetermined series of DTMF digits, or by pressing a button. As for the preceding embodiments, during the pendency of the second call, the user may toggle back and forth between the calls using button 154.

Although specific embodiments of the present invention have been described above in detail, it will be understood that this description is merely for purposes of illustration. Further variations will be apparent to one skilled in the art in light of this disclosure, and all such variations are intended to fall within the scope of the appended claims.

What is claimed is:

1. Apparatus for dynamically switching between Internet-based telephony service and PSTN-based telephony service using an analog telephone circuit selectively coupled to either the PSTN network or the Internet, the apparatus comprising:
   an interface adapted to be coupled to a PC;
   a jack adapted to be coupled to the telephone network to pass analog signals to the telephone network;
   a DTMF interface circuit adapted to be coupled to the analog telephone circuit; and
   a switch coupled to the telephone, the switch having a first position wherein the telephone is coupled to the jack and a second position wherein the telephone is coupled to the interface, the switch being programmed to move between the first and second positions responsive to detection of a predetermined sequence of DTMF digits through the DTMF interface circuit, such that the telephone may remain active while the switch moves between the first position and the second position and routes a telephone call to either the PSTN network or the Internet in response to user selection of either the PSTN network or the Internet.

2. The apparatus of claim 1 wherein the DTMF interface circuit further comprises a DTMF detection circuit.

3. The apparatus of claim 1 further comprising a subscriber line interface circuit, the subscriber line interface circuit coupled between the switch and the interface when the switch is in the second position.

4. The apparatus of claim 1 further comprising a hold circuit coupled between the jack and the interface.

5. The apparatus of claim 1 further comprising a ring detection circuit coupled between the jack and the interface.

6. The apparatus of claim 1 further comprising an off-hook detection circuit coupled between the telephone and the interface.

7. The apparatus of claim 1 further comprising a modem detection circuit coupled between the jack and the interface.

8. The apparatus of claim 1 further comprising a call-waiting detection circuit coupled between the jack and the interface.

9. The apparatus of claim 1 further comprising a line detection circuit coupled between the jack and the interface.

10. The apparatus of claim 1 wherein the interface further comprises a microcontroller.

11. The apparatus of claim 1 further comprising circuitry for digitizing voice signals coupled to the interface.

12. The apparatus of claim 1 wherein the predetermined sequence of DTMF digits comprises one of the sequences selected from the group consisting of "##", "**", "*#" and "#".

13. The apparatus of claim 1 wherein the interface is adapted to be coupled to an expansion slot of a PC.

14. The apparatus of claim 13 wherein the interface has a PCI or ISA form factor.

15. The apparatus of claim 14 wherein the interface comprises a portion of a modem circuit or sound card.

16. The apparatus of claim 1 wherein the interface is a serial port, a parallel port, or a Universal Serial Bus port.

17. The apparatus of claim 16 wherein the interface comprises a portion of a modem circuit.

18. A method for dynamically switching between Internet-based telephony service and PSTN-based telephony service using an analog telephone circuit selectively coupled to either the PSTN network or the Internet, the method comprising:
   providing apparatus adapted to be coupled to a PC, an analog telephone circuit, and a telephone network, the apparatus including an interface, a DTMF interface circuit and a switch coupled to the telephone and the DTMF interface circuit, the switch having a first position wherein the telephone is coupled to the telephone network and a second position wherein the telephone is coupled to the interface, the switch responsive to detection of a predetermined sequence of DTMF digits through the DTMF interface circuit, wherein the DTMF digits may be dialed by a user and the switch may move between the first position and the second position and route a telephone call to either the PSTN network or the Internet while the telephone is active in response to user selection of either the PSTN network or the Internet;
   coupling the apparatus to a PC, an analog telephone circuit, and the telephone network; and
   if it is desired to connect to the telephone network, dialing a telephone number while the switch is in the first position;
   if it is desired to place an Internet-based telephone call, entering the predetermined sequence of DTMF digits to cause the switch to move to the second position.

19. The method of claim 18 further comprising, after entering the predetermined sequence of DTMF digits, launching an Internet-based telephony application on the PC.

20. The method of claim 18 further comprising establishing an Internet-based telephone call.

21. The method of claim 18 further comprising, during the pendency of an internet-based telephone call:
   receiving a call-waiting signal that there is an incoming call on the first telephone network line; and
   generating a user-perceptible signal responsive to receipt of the call-waiting signal.

22. The method of claim 21 further comprising:
   entering the predetermined sequence of DTMF digits to cause the switch to move from the second to the first position; and
   accepting the incoming call.

23. The method of claim 18 wherein the apparatus further comprises a ring detection circuit, the method further comprising during the pendency of an internet-based telephone call:
   receiving an incoming call on the telephone network;
   detecting the incoming call on the telephone network using the ring detection circuit; and
   generating a user-perceptible signal responsive to an output of the ring detection circuit.

24. The method of claim 23 further comprising:

entering the predetermined sequence of DTMF digits to cause the switch to move from the second to the first position; and accepting the incoming call on the telephone network.

25. The method of claim 24 further comprising, during the pendency of the call on the telephone network:

entering the predetermined sequence of DTMF digits to cause the switch to move from the first to the second position; and resuming the internet-based telephone call.

26. A telephone comprising:

a jack adapted to be coupled to a telephone network;

an analog telephone circuit;

a microprocessor;

a modem coupled to the microprocessor; and a switching circuit having a first position wherein the analog telephone circuit is coupled to the jack for transmitting and receiving analog voice signals over the telephone network, and a second position wherein the analog telephone circuit is coupled to the jack through the microprocessor and modem for transmitting digitized voice signals over the Internet, the switching circuit being programmed to dynamically move between the first position and the second position and route a telephone call to either the PSTN network or the Internet while the telephone is active in response to user selection of either the PSTN network or the Internet.

27. The telephone of claim 26 further comprising a digital signal processor.

28. The telephone of claim 26 further comprising a coding/decoding circuit.

29. The telephone of claim 26 further comprising a subscriber line interface circuit coupled between the analog telephone circuit and the microprocessor.

30. The telephone of claim 26 further comprising circuitry for detecting a call waiting signal.

31. The telephone of claim 26 further comprising circuitry for detecting a ring signal.

32. The telephone of claim 26 further switching circuit moves between the first and second positions responsive to actuation of the button.

33. A method for dynamically switching between Internet-based telephony service and PSTN-based telephony service using an analog telephone circuit selectively coupled to either the PSTN network or the Internet, the method comprising:

providing apparatus adapted to be coupled to a telephone line, the apparatus including a jack, an analog telephone circuit, a microprocessor, a modem, and a switching circuit, the switching circuit having a first position wherein the analog telephone circuit is coupled to the jack for transmitting and receiving analog voice signals over the telephone network, and a second position wherein the analog telephone circuit is coupled to the jack through the microprocessor and modem for transmitting digitized voice signals over the Internet, wherein the switching circuit may move between the first position and the second position and route a telephone call to either the PSTN network or the Internet while the telephone is active in response to user selection of either the PSTN network or the Internet;

coupling the jack to the telephone line; and if it is desired to connect to the telephone network, dialing a telephone number while the switching circuit is in the first position;

if it is desired to place an Internet-based telephone call, actuating the switching circuit to cause the switching circuit to move to the second position.

34. The method of claim 33 further comprising, after moving the switching circuit to the second position, executing an Internet-based telephony application by the microprocessor.

35. The method of claim 33 further comprising establishing an Internet-based telephone call.

36. The method of claim 33 further comprising, during the pendency of an Internet-based telephone call:

receiving a call-waiting signal that there is an incoming call; and generating a user-perceptible signal responsive to receipt of the call-waiting signal.

37. The method of claim 36, wherein the telephone further comprises a button coupled to the switching circuit, the method further comprising:

actuating the button to cause the switching circuit to move from the second to the first position; and accepting the incoming call.

38. The method of claim 37 further comprising, after accepting the incoming call, actuating the button again to return to the Internet-based telephone call.

39. The method of claim 33 further comprising, during the pendency of an Internet-based telephone call:

receiving a ring signal that there is an incoming call; and generating a user-perceptible signal responsive to receipt of the ring signal.

40. The method of claim 39, wherein the telephone further comprises a button coupled to the switching circuit, the method further comprising:

actuating the button to cause the switching circuit to move from the second to the first position; and accepting the incoming call.

41. The method of claim 40 further comprising, after accepting the incoming call, actuating the button again to return to the Internet-based telephone call.

42. A module for selectively using a telephone to dynamically switch between Internet-based telephony service or PSTN-based telephony service, the module comprising:

a first jack adapted to be coupled to an analog telephone;

a second jack adapted to be coupled to a telephone network;

a microprocessor;

a modem coupled to the microprocessor; and a switching circuit having a first position wherein the first jack is coupled to the second jack for transmitting and receiving analog voice signals from an analog telephone over the telephone network, and a second position wherein the first jack is coupled to the second jack through the microprocessor and modem for transmitting digitized voice signals over the Internet, wherein the telephone may remain active while the switching circuit moves between the first position and the second position and routes a telephone call to either the PSTN network or the Internet in response to user selection of either the PSTN network or the Internet.

43. The module of claim 42 further comprising a digital signal processor.

44. The module of claim 42 further comprising a coding/decoding circuit.

45. The module of claim 42 further comprising a subscriber line interface circuit coupled between the first jack and the microprocessor.

46. The module of claim 42 wherein the modem further comprises circuitry for detecting a call waiting signal.

47. The module of claim 42 wherein the modem further circuitry for detecting a ring signal.

48. The module of claim 42 further comprising a button, and the switching circuit moves between the first and second positions responsive to actuation of the button.

49. A method of dynamically switching between Internet-based telephony service and PSTN-based telephony service using an analog telephone circuit selectively coupled to either the PSTN network or the Internet, the method comprising:

providing apparatus adapted to be coupled to an analog telephone via a first jack and a telephone line via a second jack, a microprocessor, a modem, and a switching circuit, the switching circuit having a first position wherein the first jack is coupled to the second jack for transmitting and receiving analog voice signals from an analog telephone over the telephone network, and a second position wherein the first jack is coupled to the second jack through the microprocessor and modem for transmitting digitized voice signals over the Internet, wherein the telephone may remain active while the switch moves between the first position and the second position and routes a telephone call to either the PSTN network or the Internet in response to user selection of either the PSTN network or the Internet;

coupling the first jack to a telephone;

coupling the second jack to a telephone line; and if it is desired to place a telephone call using the telephone network, dialing a telephone number while the switching circuit is in the first position; and if it is desired to place an Internet-based telephone call, actuating the switching circuit to cause the switching circuit to move to the second position.

50. The method of claim 49 further comprising, after moving the switching circuit to the second position, executing an internet-based telephony application by the microprocessor.

51. The method of claim 49 further comprising establishing an internet-based telephone call.

52. The method of claim 49 further comprising, during the pendency of an internet-based telephone call:

receiving a call-waiting signal that there is an incoming call; and generating a user-perceptible signal responsive to receipt of the call-waiting signal.

53. The method of claim 52, wherein the telephone further comprises a button coupled to the switching circuit, the method further comprising:

actuating the button to cause the switching circuit to move from the second to the first position; and accepting the incoming call.

54. The method of claim 52 further comprising, after accepting the incoming call, actuating the button again to return to the internet-based telephone call.

55. The method of claim 49 further comprising, during the pendency of an Internet-based telephone call:

receiving a ring signal that there is an incoming call; and generating a user-perceptible signal responsive to receipt of the ring signal.

56. The method of claim 55, wherein the telephone further comprises a button coupled to the switching circuit, the method further comprising:

actuating the button to cause the switching circuit to move from the second to the first position; and accepting the incoming call.

57. The method of claim 56 further comprising, after accepting the incoming call, actuating the button again to return to the Internet-based telephone call.

* * * * *

UNITED STATES PATENT AND TRADEMARK OFFICE
CERTIFICATE OF CORRECTION

PATENT NO. : 6,700,956 B2
DATED : March 2, 2004
INVENTOR(S) : Chang et al.

It is certified that error appears in the above-identified patent and that said Letters Patent is hereby corrected as shown below:

Title page,
Item [56], References Cited, OTHER PUBLICATIONS, change "Promotional material fpr Quicknet Technologies, Inc." to -- Promotional material for Quicknet Technologies, Inc. --

Column 3,
Line 1, change "connected a" to -- connected to a --
Line 32, change "as well the" to -- as well as the --

Column 5,
Line 53, change "circuit 39, off-hook" to -- circuit 39, and off-hook --
Lines 60-61, change "apparatus to include apparatus 10 that" to -- apparatus 10 may include call waiting detect circuitry 47 that, --

Column 6,
Line 20, change "a Internet" to -- an Internet --

Column 7,
Line 17, change "switch" to -- switch 33 --
Line 26, change "DSP42/CODEC17" to -- DSP42/CODEC37 --
Line 37, change "PC14" to -- PC 14 --

Column 8,
Line 7, change "the internal card is" to -- internal card 55 is --

Column 10,
Line 67, change "that above-described" to -- that in the above-described --

Column 12,
Line 14, delete "the"

Column 13,
Line 67, change "#" to -- "#*" --

Column 14,
Lines 47 and 60, change "internet-based" to -- Internet-based --

UNITED STATES PATENT AND TRADEMARK OFFICE
CERTIFICATE OF CORRECTION

PATENT NO.    : 6,700,956 B2
DATED         : March 2, 2004
INVENTOR(S)   : Chang et al.

It is certified that error appears in the above-identified patent and that said Letters Patent is hereby corrected as shown below:

<u>Column 15,</u>
Line 11, change "internet-based" to -- Internet-based --
Line 43, after "further" insert -- comprising a button, and the --

<u>Column 17,</u>
Line 7, before "circuitry" insert -- comprises --

<u>Column 18,</u>
Lines 3, 6, 8 and 21, change "internet-based" to -- Internet-based --

Signed and Sealed this

Twentieth Day of July, 2004

JON W. DUDAS
*Acting Director of the United States Patent and Trademark Office*